(12) United States Patent
Lee et al.

(10) Patent No.: US 10,358,123 B2
(45) Date of Patent: Jul. 23, 2019

(54) MULTI-MODE ENGINE-DISCONNECT CLUTCH ASSEMBLIES AND CONTROL LOGIC FOR HYBRID ELECTRIC VEHICLES

(71) Applicant: GM Global Technology Operations LLC, Detroit, MI (US)

(72) Inventors: Chunhao J. Lee, Troy, MI (US); Neeraj S. Shidore, Novi, MI (US); Dongxu Li, Troy, MI (US); Norman K. Bucknor, Troy, MI (US); Farzad Samie, Franklin, MI (US); Derek F. Lahr, Howell, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 31 days.

(21) Appl. No.: 15/829,043

(22) Filed: Dec. 1, 2017

(65) Prior Publication Data

US 2019/0168731 A1 Jun. 6, 2019

(51) Int. Cl.
| | |
|---|---|
| *B60W 10/02* | (2006.01) |
| *B60W 20/40* | (2016.01) |
| *B60L 15/20* | (2006.01) |

(52) U.S. Cl.
CPC ........ *B60W 10/026* (2013.01); *B60W 10/023* (2013.01); *B60W 20/40* (2013.01); *B60L 15/2054* (2013.01); *B60W 10/02* (2013.01); *B60W 2510/0208* (2013.01); *B60W 2710/021* (2013.01); *Y10T 477/26* (2015.01)

(58) Field of Classification Search
CPC .. Y10T 477/26; B60L 15/2054; B60W 10/02; B60W 20/40; B60W 2510/0208; B60W 2710/021

See application file for complete search history.

(56) References Cited

U.S. PATENT DOCUMENTS

| | | | |
|---|---|---|---|
| 4,860,861 A | 8/1989 | Gooch et al. | |
| 5,947,243 A | 9/1999 | MacDonald | |
| 7,198,587 B2 | 4/2007 | Samie et al. | |
| 7,464,778 B2 * | 12/2008 | Kato | B60K 6/46 |
| | | | 180/305 |

(Continued)

FOREIGN PATENT DOCUMENTS

EP 0200335 A2 11/1986

*Primary Examiner* — Roger L Pang
(74) *Attorney, Agent, or Firm* — Quinn IP Law

(57) ABSTRACT

Presented are engine-disconnect clutches with attendant control logic, methods for making/operating such disconnect clutches, and hybrid electric vehicles (HEV) equipped with an engine that is coupled to/decoupled from a transmission and electric motor via a disconnect clutch. A representative method for controlling an HEV powertrain includes receiving an HEV powertrain operation command, then determining a clutch mode of a multi-mode clutch device to execute the HEV powertrain operation. This multi-mode clutch device is operable in: a lock-lock mode, in which the clutch device transmits torque to and from the engine; a free-free mode, in which the clutch device disconnects the engine's output member from the transmission's input member, preventing torque transmission to and from the engine; a lock-free mode, in which the clutch device transmits torque from but not to the engine; and, a free-lock mode, in which the clutch device transmits torque to but not from the engine.

20 Claims, 3 Drawing Sheets

(56) References Cited

U.S. PATENT DOCUMENTS

| | | | |
|---|---|---|---|
| 7,681,675 B2 | 3/2010 | Samie et al. | |
| 7,846,051 B2 * | 12/2010 | Holmes | B60K 6/387 |
| | | | 475/5 |
| 7,862,437 B2 | 1/2011 | Clark et al. | |
| 7,878,935 B2 | 2/2011 | Lahr | |
| 7,931,561 B2 | 4/2011 | Otanez et al. | |
| 7,980,992 B2 | 7/2011 | Sturgin | |
| 8,011,464 B2 | 9/2011 | Samie et al. | |
| 8,042,670 B2 | 10/2011 | Bartos et al. | |
| 8,267,231 B2 * | 9/2012 | Holmes | B60K 6/50 |
| | | | 192/43.1 |
| 8,307,925 B2 * | 11/2012 | Tang | B60K 6/383 |
| | | | 180/65.275 |
| 8,425,364 B2 | 4/2013 | Lahr | |
| 8,499,912 B2 | 8/2013 | Samie et al. | |
| 8,753,240 B2 * | 6/2014 | Kato | B60K 6/365 |
| | | | 475/5 |
| 8,801,556 B2 * | 8/2014 | Kato | B60K 6/383 |
| | | | 475/5 |
| 10,024,373 B2 * | 7/2018 | Itagaki | F16D 41/125 |
| 2005/0126878 A1 | 6/2005 | Samie | |
| 2015/0343890 A1 * | 12/2015 | Ortmann | B60K 6/383 |
| | | | 477/5 |
| 2017/0240038 A1 * | 8/2017 | Spangler | B60K 17/356 |

* cited by examiner

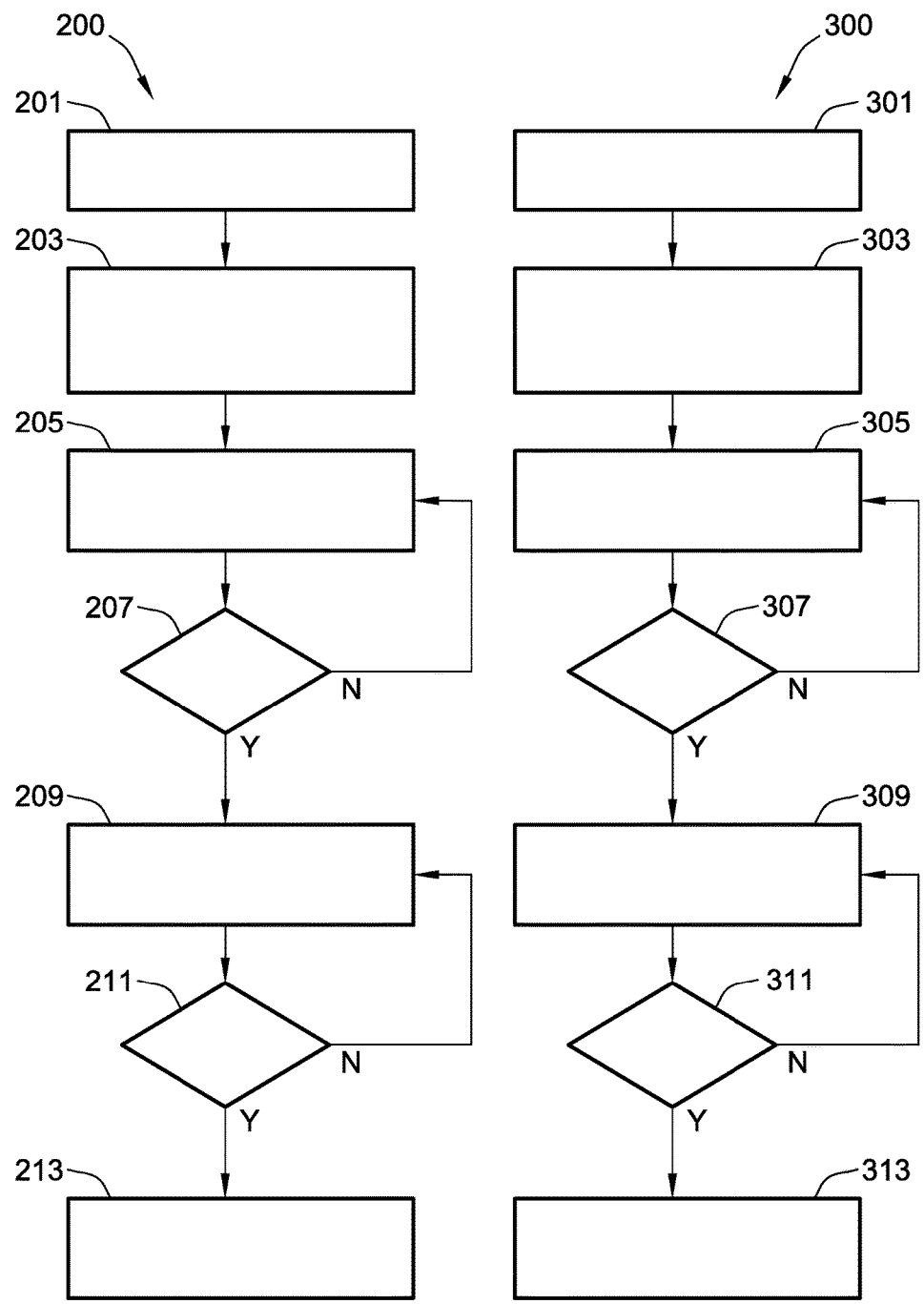
FIG. 4  FIG. 5

MULTI-MODE ENGINE-DISCONNECT CLUTCH ASSEMBLIES AND CONTROL LOGIC FOR HYBRID ELECTRIC VEHICLES

INTRODUCTION

The present disclosure relates generally to motor vehicle powertrains. More specifically, aspects of this disclosure relate to multi-mode engine-disconnect clutch devices and attendant control logic for hybrid electric powertrains.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving power through a manually or automatically shifted multi-speed power transmission to the vehicle's final drive system (e.g., differential, axle, and road wheels). Automobiles have traditionally been powered by a reciprocating-piston type internal combustion engine (ICE) assembly because of its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples. Hybrid and full-electric vehicles, on the other hand, utilize alternative power sources to propel the vehicle and, thus, minimize or eliminate reliance on a fossil-fuel based engine for power.

Hybrid vehicle powertrains utilize multiple traction power sources to propel the vehicle, such as a combustion engine assembly operating in conjunction with a battery-powered or fuel-cell-powered electric motor. A hybrid electric vehicle (HEV), for example, stores both electrical energy and chemical energy, and converts the same into mechanical power to drive the vehicle's road wheels. The HEV is generally equipped with an electric machine (E-machine), such as an electric motor/generator unit, that operates in parallel or in series with an internal combustion engine. Since hybrid vehicles are designed to derive their power from sources other than the engine, engines in HEVs may be turned off, in whole or in part, while the vehicle is propelled by the electric motor(s). A full electric vehicle (FEV)—colloquially referred to as "all-electric" vehicles—is an alternative type of electric-drive vehicle configuration that altogether eliminates the internal combustion engine and attendant peripheral components from the powertrain system, relying solely on electric tractive motors for vehicle propulsion.

Vehicle powertrains employing an automatic transmission commonly insert a hydrodynamic torque converter between the internal combustion engine and the multi-speed transmission to govern the transfer of rotational torque therebetween. Torque converters are designed to selectively transmit power from the engine to the drivetrain system for vehicle propulsion, and to allow the crankshaft to spin without the engine stalling when the vehicle wheels and transmission gears come to a stop. Replacing the mechanical clutch of a manual transmission, a standard torque converter (TC) acts as a fluid coupling with a fluid impeller that is connected to the engine's output shaft, a turbine that is connected to the transmission's input shaft, and a stator interposed between the impeller and turbine to regulate fluid flow between their respective fluid volumes. A hydraulic pump modulates hydraulic fluid pressure within the torque converter housing to regulate the transfer of rotational energy from the impeller to the turbine. A large difference in speed between the impeller and turbine results in torque multiplication of the impeller torque, as for example when the vehicle is accelerating from rest with the engine running.

Some torque converters are equipped with a clutch mechanism that is engaged to rigidly connect the engine crankshaft to the transmission input shaft when their speeds are nearly equal, e.g., to avoid unwanted slippage and resultant efficiency losses. System "slip" occurs because the rotational speed of the impeller relative to the turbine in the torque converter is inherently different. A large slip percentage between the engine output and the transmission input affects the fuel economy of the vehicle; employing a torque converter clutch (TCC) helps to reduce the slip between the engine and the transmission. The TCC operates to mechanically lock the impeller at the output of the engine to the turbine at the input of the transmission so that the engine output and transmission input rotate at the same speed. Application of the TCC may be controlled by a powertrain control module (PCM) to modify clutch engaging forces under certain operating conditions, for example, during shifts to eliminate undesired torque fluctuations and engine speed changes during transient periods when torque flow interruption is desired.

Parallel hybrid and series hybrid architectures both incorporate a combustion engine and one or more electric motors to propel the vehicle; series hybrid architectures, however, derive all tractive power from electric motor(s) and, thus, eliminate any driving mechanical connection between the engine and final drive members. The engine and motor/generator assemblies of parallel hybrid architectures, by comparison, each have a driving mechanical coupling to the power transmission. One of the many available types of parallel hybrid powertrains is the P2 architecture, which may be typified by a single engine, a standard transmission, and a single motor/generator unit (MGU) that is "side attached" in parallel power-flow communication to the engine and transmission. Mechanically interposed between the engine and motor/generator is a disconnect clutch that, unlike the TCC discussed above, drivingly disengages the engine from both the MGU and transmission such that the MGU can be operated independently to propel the vehicle. P2 architectures help to reduce system costs over counterpart hybrid powertrains by eliminating the use of additional MGUs and reducing the complexity of the transmission. The P2 architecture also helps to eliminate engine friction during regenerative braking operations, and allows the motor/generator to spin at higher speeds while recovering more energy.

SUMMARY

Disclosed herein are engine-disconnect clutch devices and attendant control logic, methods for making and methods for operating such clutch devices, and motor vehicles equipped with an internal combustion engine that is operatively coupled to/decoupled from a multi-speed transmission and electric motor via an intermediate disconnect clutch device. By way of example, there is presented a mode selection control strategy for a multi-mode selectable one-way clutch (SOWC) in a P2 hybrid powertrain architecture employing an automatic transmission. In this example, the SOWC is integrated between an engine flexplate and a torque converter pump, with a damper assembly interposed between the SOWC's pocket plate and the TC cover, e.g., to help prevent strut lift off. The disconnect clutch is electronically actuated using a solenoid-driven brake, and is sealed with a partial fill to help eliminate centrifugal pressure on the notch plate. The in-vehicle programmable control unit executes control logic to govern the disconnect SOWC during various vehicle operations, such as key crank, motor-only driving, engine-only driving, motor-boosting driving, regenerative (regen) braking, and power shifts, as well as during deceleration fuel cutoff (DFCO) operations and engine disconnect regen. Disclosed control strategies also provide motor/generator unit (MGU), brake system, and transmission state control to effect seamless SOWC unloading, e.g., during vehicle coast and braking events.

Attendant benefits for at least some of the disclosed concepts include improved vehicle fuel economy resulting from HEV powertrain architectures and control mode techniques that enable driving at low vehicle speeds and loads without compromising drivability, e.g., for a P2 hybrid system. Additional fuel savings may be realized by eliminating the need to start the engine when unloading the engine disconnect SOWC. Disclosed engine disconnect SOWC control strategies allow the engine to be readily disconnected during braking events, which helps to improve the capture of vehicle regenerative energy. Other attendant benefits may include faster tip-in and tip-out response with quicker engine engagement to and disengagement from the driveline. Improved drivability may be achieved by emulating engine drag through the motor after engine disconnect, for example, via mechanical brake "fill in" during neutral state, which helps to ensure a faster transition from neutral to a gear state through active turbine speed matching.

Aspects of this disclosure are directed to control methods for operating a multi-mode engine disconnect SOWC in a P2 hybrid architecture with an automatic transmission and a hydrokinetic torque converter. For instance, a method is presented for controlling operation of an HEV powertrain. The representative method includes, in any order and in any combination with any of the disclosed features and options: receiving, e.g., via a powertrain control module of a resident or remote vehicle controller, a command signal indicative of an HEV powertrain operation, the HEV operation being dependent upon a driver input and a current vehicle operating condition; determining, e.g., via the vehicle controller, a current clutch mode of a multi-mode clutch device that is operable to selectively connect and disconnect an output member of an engine to/from an input member of a power transmission in the HEV powertrain, the current clutch mode being dependent upon the current vehicle operating condition; determining a "matching" clutch mode of the multi-mode clutch device to execute the commanded HEV powertrain operation; and, in response to the current and matching clutch modes being different, transmitting a command signal to the multi-mode clutch device to switch to the matching clutch mode. The multi-mode clutch device is operable in any of at least four modes: a lock-lock mode, in which the multi-mode clutch device transmits torque to and from the engine; a free-free mode, in which the multi-mode clutch device disconnects the engine's output member from the transmission's input member and thereby prevents torque transmission to and from the engine; a lock-free mode, in which the multi-mode clutch device transmits torque from the engine, but not to the engine; and, a free-lock mode, in which the multi-mode clutch device transmits torque to the engine, but not from the engine.

Other aspects of the present disclosure are directed to electric-drive motor vehicles equipped with a reciprocating-piston-type internal combustion engine assembly that is operatively connected to and disconnected from both an automatic power transmission and an electric motor/generator unit via a multi-mode disconnect clutch device. As used herein, the term "motor vehicle" may include any relevant vehicle platform, such as passenger vehicles (plug-in hybrid electric vehicle (PHEV), fuel cell hybrid vehicles, fully or partially autonomous, etc.), commercial vehicles, industrial vehicles, tracked vehicles, off-road and all-terrain vehicles (ATV), farm equipment, boats, airplanes, etc. Presented, for example, is a hybrid electric vehicle equipped with an HEV powertrain for driving multiple road wheels that are rotatably mounted to the vehicle body. An internal combustion engine assembly is attached to the body of the HEV, e.g., mounted inside an engine compartment. A motor/generator unit is also attached to the vehicle body, e.g., mounted inside the engine compartment adjacent the ICE, and operatively connected in parallel power-flow communication with the ICE assembly. A crankshaft transfers torque to and from the ICE assembly, while a motor shaft transfers torque to and from the MGU. A multi-speed transmission receives, selectively modifies, and transmits torque output by the MGU and ICE assembly to drive one or more of the road wheels.

Continuing with the above example, the HEV also includes a multi-mode selectable one-way clutch that is interposed between the ICE assembly and both the MGU and multi-speed transmission. The multi-mode SOWC is operable in at least four clutch modes: a lock-lock mode, in which the SOWC transmits torque both to and from the engine; a free-free mode, in which the multi-mode SOWC disconnects the engine from the transmission and the MGU to thereby prevent torque transmission to and from the engine; a lock-free mode, in which the multi-mode SOWC transmits torque from, but not to the engine; and, a free-lock mode, in which the multi-mode SOWC transmits torque to, but not from the engine. A vehicle controller, which is communicatively connected to the multi-mode SOWC, is programmed to execute memory stored instructions to: receive a command signal indicative of an HEV powertrain operation; determine a current clutch mode of the multi-mode SOWC; determine a matching clutch mode of the multi-mode SOWC to execute the HEV powertrain operation; and, responsive to the current and matching clutch modes being different, transmit a command signal to the multi-mode SOWC to switch from the current clutch mode to the matching clutch mode. The HEV powertrain operation command signal may be dependent on various vehicle operating states, including vehicle speed, clutch state, MGU state, engine state, etc. If the current clutch mode is the same as or otherwise compatible with the matching clutch mode for purposes of executing the commanded HEV powertrain operation, a switch command signal is not transmitted to the multi-mode SOWC.

Additional aspects of the present disclosure are directed to methods for making and methods for operating any of the disclosed clutch devices, any of the disclosed HEV powertrains, and/or any of the disclosed motor vehicles. Aspects of the present disclosure are also directed HEV powertrains and multi-mode engine disconnect SOWCs. Also presented herein are non-transitory, computer readable media storing instructions executable by at least one of one or more processors of one or more in-vehicle and/or off-board vehicle controllers, such as a programmable electronic control unit (ECU) or powertrain control module, to govern operation of a disclosed engine disconnect device.

The above summary is not intended to represent every embodiment or every aspect of the present disclosure. Rather, the foregoing summary merely provides an exemplification of some of the novel concepts and features set forth herein. The above features and advantages, and other features and advantages, will be readily apparent from the following detailed description of illustrated embodiments and representative modes for carrying out the disclosure when taken in connection with the accompanying drawings and appended claims. Moreover, this disclosure expressly includes any and all combinations and subcombinations of the elements and features presented above and below.

BRIEF DESCRIPTION OF THE DRAWINGS

FIG. 4 is a flowchart of a representative algorithm or method for controlling operation of an HEV during a coasting event that may correspond to instructions executed by onboard control-logic circuitry, programmable electronic control unit, or other computer-based device of a motor vehicle in accordance with aspects of the disclosed concepts.

FIG. 5 is a flowchart of a representative algorithm or method for controlling operation of an HEV during a regenerative braking event that may correspond to instructions executed by onboard control-logic circuitry, programmable electronic control unit, or other computer-based device of a motor vehicle in accordance with aspects of the disclosed concepts.

Figure 1:
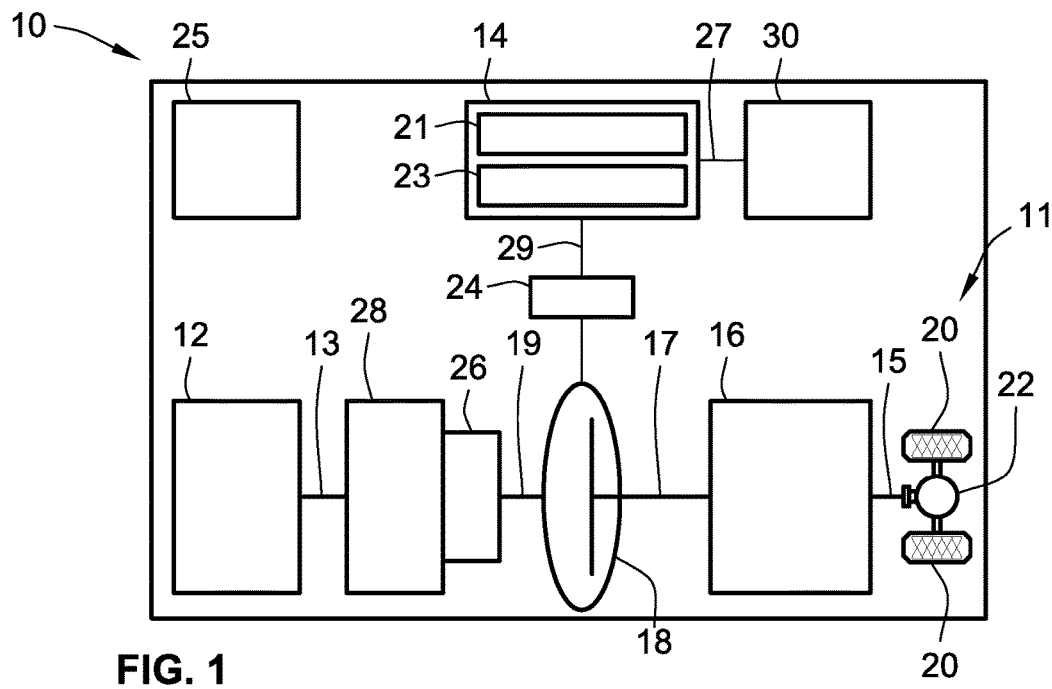
FIG. 1 is a schematic illustration of a representative hybrid electric motor vehicle with a powertrain having an engine assembly and a motor/generator unit drivingly connected to a final drive system by two clutch devices and a multi-speed power transmission in accordance with aspects of the present disclosure.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope of this disclosure as defined by the appended claims.

DETAILED DESCRIPTION

This disclosure is susceptible of embodiment in many different forms. There are shown in the drawings and will herein be described in detail representative embodiments of the disclosure with the understanding that these illustrated examples are provided as an exemplification of the disclosed principles, not limitations of the broad aspects of the disclosure. To that extent, elements and limitations that are described, for example, in the Abstract, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a normal driving surface, for example.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel P2 hybrid-electric powertrain. In particular, the illustrated powertrain is generally composed of a single engine 12 and a single motor 14 that operate, individually and in concert, to transmit tractive power to a multi-speed power transmission 16 through a hydrokinetic torque converter 18 to drive one or more road wheels 20 of the vehicle's drivetrain 11. The illustrated automobile 10—also referred to herein as "motor vehicle" or "vehicle" for short—is merely an exemplary application with which novel aspects and features of this disclosure can be practiced. In the same vein, implementation of the present concepts into a P2 hybrid powertrain architecture should also be appreciated as an exemplary application of the novel concepts disclosed herein. As such, it will be understood that aspects and features of the present disclosure can be applied to other vehicle powertrain configurations and utilized for any logically relevant type of motor vehicle. Lastly, only select components of the vehicle have been shown and will be described in additional detail herein. Nevertheless, the vehicles and powertrains discussed below can include numerous additional and alternative features, and other well-known peripheral components, e.g., for carrying out the various methods and functions of this disclosure.

The representative vehicle powertrain system is shown in FIG. 1 with a prime mover, such as a restartable internal combustion engine assembly 12 that is drivingly connected to a driveshaft 15 of a final drive system 11 by a multi-speed automatic power transmission 16. The engine 12 transfers power, preferably by way of torque via an engine crankshaft 13 (or "engine output member") to an input side of the transmission 16. As shown, the prime mover 12 directly drives a multi-mode engine-disconnect clutch device 28 which, when operatively engaged, drives the TC 18 via a torsional damper assembly 26. This engine-disconnect clutch device 28 transmits torque received from the ICE 12 by way of the damper 26 to input structure of the TC 18. The transmission 16, in turn, is adapted to receive, selectively manipulate, and distribute tractive power from the engine 12 to the vehicle's final drive system 11—represented herein by a driveshaft 15, rear differential 22, and a pair of rear road wheels 20—and thereby propel the hybrid vehicle 10. In the example depicted in FIG. 1, the ICE assembly 12 may be any available or hereafter developed engine, such as a two or four-stroke compression-ignited diesel engine or a four-stroke spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD)

layouts, rear wheel drive (RWD) layouts, four-wheel drive (4WD) layouts, all-wheel drive (AWD) layouts, etc.

FIG. 1 also depicts an electric motor/generator unit 14 or other E-machine that operatively connects via a motor shaft 29 (or "motor output member") to a main shaft 17 (or "transmission input member") of the electro-hydraulic transmission 16 via the torque converter 18. The motor/generator unit 14 can be directly coupled onto a TC input shaft 19 or splined housing portion (e.g., front cover 38 of FIG. 2) of the torque converter 18 via one or more selectively engageable torque transmitting mechanisms 24 (e.g., clutch, brake, etc.). The electric motor/generator unit 14 is composed of an annular stator 21 circumscribing and concentric with a rotor 23. Electric power is provided to the stator 21 through electrical conductors or cables 27 that pass through the motor housing in suitable sealing and insulating feedthroughs (not illustrated). Conversely, electric power may be provided from the MGU 14 to an onboard traction battery pack 30 via regenerative braking. Operation of any of the illustrated powertrain components may be governed by an onboard or remote vehicle controller, such as programmable electronic control unit (ECU) 25. While shown as a P2 hybrid-electric architecture with a single motor in parallel power-flow communication with a single engine assembly, the vehicle 10 may employ other powertrain configurations, including PS, P1, P3, and P4 hybrid powertrains, any of which may be adapted for an HEV, PHEV, range-extended hybrid vehicle, or fuel-cell hybrid vehicle, etc.

As indicated above, ECU 25 is constructed and programmed to govern, among other things, operation of the engine 12, motor 14, transmission 16, TC 18, and clutches 24, 28. Control module, module, controller, control unit, electronic control unit, processor, and any permutations thereof may be defined to mean any one or various combinations of one or more of logic circuits, Application Specific Integrated Circuit(s) (ASIC), electronic circuit(s), central processing unit(s) (e.g., microprocessor(s)), and associated memory and storage (e.g., read only, programmable read only, random access, hard drive, tangible, etc.)), whether resident, remote or a combination of both, executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms may be defined to mean any controller executable instruction sets including calibrations and look-up tables. The ECU may be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed in real-time, continuously, systematically, sporadically and/or at regular intervals, for example, each 100 microseconds, 3.125, 6.25, 12.5, 25 and 100 milliseconds, etc., during ongoing vehicle use or operation. Alternatively, routines may be executed in response to occurrence of an event during operation of the vehicle 10.

Figure 2:
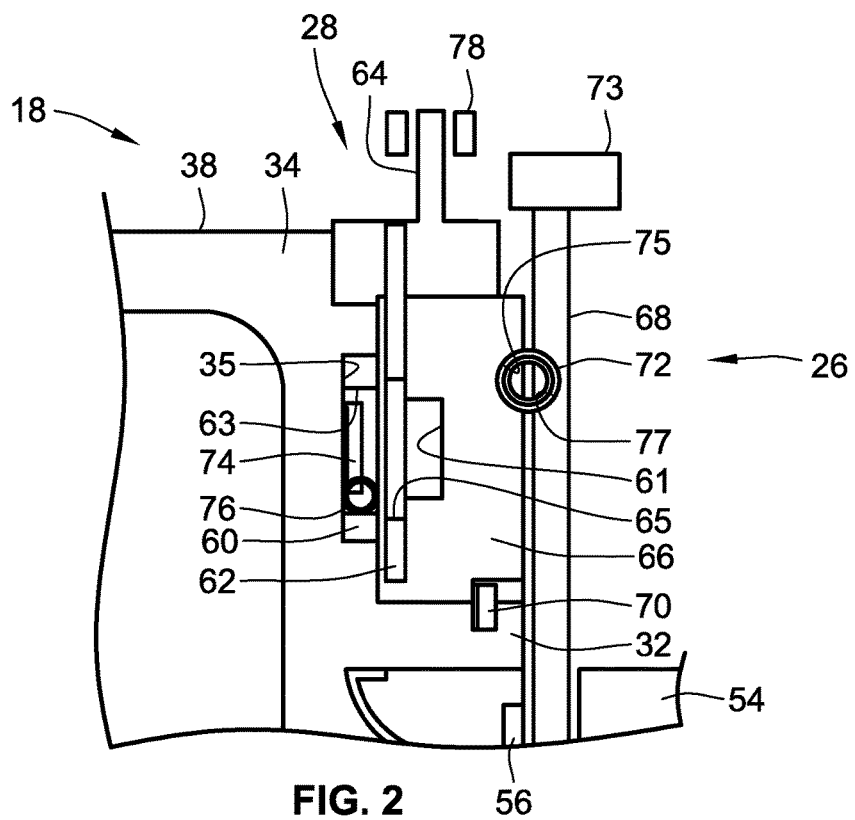
FIG. 2 is a cross-sectional side-view illustration of select portions of a representative hydrodynamic torque converter, engine-disconnect clutch, and torsional damper assembly in accordance with aspects of the present disclosure.

FIG. 2 is a cross-sectional side-view illustration of a portion of a representative torque converter assembly 18. Hydrokinetic torque converter assembly 18 is a fluid coupling for operatively connecting and disconnecting the ICE assembly 12 and electric motor/generator unit 14 to/from the internal gearing of the power transmission 16. The torque converter assembly 18 may be generally comprised of a torque converter impeller, a bladed turbine, and a relatively stationary stator. The impeller—also referred to in the art as "pump"—is situated in serial power-flow fluid communication with the turbine. To protect these components, the torque converter assembly 18 is constructed with an annular housing, defined principally by an engine-side front cover 38 (also referred to herein as "pump housing") fixedly attached, e.g., via electron beam welding, MIG or MAG welding, laser welding, and the like, to a transmission-side pump shell portion (not visible in FIG. 2) such that a working hydraulic fluid chamber is formed therebetween.

Interposed between the impeller and turbine is a stator that selectively alters fluid flow returning from the turbine to the impeller such that returning fluid aids, rather than impedes, rotation of the impeller. The transfer of engine torque from the crankshaft 13 to the turbine, via the annular housing front cover 38 and impeller, is through the operation of hydraulic fluid, such as transmission oil in the TC fluid chamber. More specifically, rotation of impeller blades, retained between the pump shell and an inner shroud, causes the hydraulic fluid to be directed toroidally outward toward the turbine. When this occurs with sufficient force to overcome the inertial resistance to rotation, turbine blades, which are coaxially oriented with the impeller blades and retained between the inner shroud and a turbine shell, begin to rotate with the impeller. The fluid flow exiting the turbine is directed back into the impeller by way of the stator. The stator, located between the flow exit section of the turbine and the flow entrance section of the impeller, redirects fluid flow from the turbine to the impeller in the same direction as impeller rotation, thereby reducing pump torque and causing torque multiplication.

Fundamentally, as the internal combustion engine 12 turns off to on, on to off, and operates at different rotational speeds during transient modes, it may produce torque-related vibrations and oscillations (colloquially known as "torsionals"). By way of example, when fuel is being fed to the engine 12 and it is under power, e.g., through engagement of a fuel throttle during normal operation, the engine 12 may produce torsionals that are undesirable to transmit to, and through, the transmission 16. In addition, when the engine 12 is not being fueled or is not under power (e.g., in a startup and/or a shutdown operation), the engine pistons may generate compression pulses. Both the torsionals and compression pulses can produce resultant vibrations, noise and rattle that may be sensed by a vehicle occupant. To help reduce or otherwise cancel out the torsionals, torque swings and compression pulses that may be produced by the engine 12, the vehicle 10 is equipped with an engine-disconnect clutch device 28 and damper assembly 26. As will be described in detail below, the damper assembly 26 generally functions to isolate the torque converter 18 and, thus, the transmission 16 from unwanted torsionals generated by the engine 12, and also to selectively aide the motor/generator unit 14 in canceling engine compression pulses during startup and shutdown operations.

According to the representative example illustrated in FIG. 2, the engine-disconnect clutch device 28 is generally comprised of a pocket plate 60, a selector plate 62, a braking ring 64, a notch plate 66, and a flex plate 68 (positioned in that order, from TC 18 to ICE 12). In the same vein, the damper assembly 26 of FIG. 2 is generally comprised of the notch plate 66, flex plate 68, and one or more spring systems 72 sandwiched between the notch and flex plates 66, 68. As shown, the notch plate 66 is interposed between and coaxially aligned with the pocket and flex plates 60, 68, with the braking ring 64 concentric with the pocket, selector, and notch plates 60, 62, 66. The disconnect clutch device 28 may also include a retaining ring 70 for aligning the notch plate 66 on the pump housing 38, and applying a suitable axial retaining force to operatively retain the notch plate 66 with respect to the pocket plate 60. During operation of the clutch device 28, the force transmitted between the pocket plate 60 and notch plate 66 includes both axial and radial components; the axial component exerts a separating force between the pocket plate 60 and the notch plate 66. The retaining ring 70 (see FIG. 2) is installed in a retaining ring groove provided within the front cover 38 to serve as the reaction member for this axial force.

Pocket plate 60 functions, in part, to rigidly attach the engine-disconnect clutch device 28 and, indirectly, the damper assembly 26 to the torque converter 18. By way of non-limiting example, the TC pump housing 38 is integrally formed with a generally cylindrical hub portion 32 that projects orthogonally from a disk-shaped flange portion 34. Pocket plate 60 may be fabricated as a disk-shaped annulus that is mounted on or into the pump housing 38 such that the torque converter 18 and engine-disconnect clutch device 28 are coaxially aligned to both rotate about a common axis. To operatively align and retain the pocket plate 60, the flange portion 34 of the TC pump housing 38 may be fabricated with an annular slot 35 that extends in a continuous manner along the engine-side face of the housing 38. In this example, the pocket plate 60 has an internal bore and an outer-diameter periphery, the latter of which is formed with externally-projecting teeth or external splines (not shown) that engage or otherwise mate with internally-projecting splines or teeth (not shown) of the slot 35.

Engine-disconnect clutch device 28 is portrayed herein for purposes of discussion as a strut-type selectable one-way clutch (SOWC). Alternatively, the engine-disconnect clutch device 28 may take on other available constructions, such as selectable roller or needle clutches, controllable mechanical diode clutches, and sprag or pawl clutch designs, as a few non-limiting examples. This disclosure contemplates that other selectable, reversible and multi-mode torque transmitting devices could be used to effectuate the features of the present disclosure. Pocket plate 60 of FIG. 2, for example, is fabricated with a series of circumferentially spaced pockets 63 (one of which is visible in FIG. 2), each of which is recessed into or extends through a forward-facing, engine-side surface of the plate 60. Each pocket 63 movably nests therein a respective engaging element that functions to engage with torque-transmitting structure of the notch plate 66. In so doing, the engaging elements cooperatively lock the pocket plate 28 (and the torque converter 18) to the notch plate 66 (and the crankshaft 13) such that these components all rotate in unison with one another. According to the representative architecture of FIG. 2, each engaging element is composed of a spring-biased strut 74 that is pivotably seated within a respective one of the aforementioned pockets 63. Each strut 74 is provided with a respective biasing member 76, which may be a torsion spring, coil spring, constant force spring, or any other element capable of providing lift to one end of the engaging element.

Notch plate 66 functions, in part, to operatively attach the flex plate 68 and, indirectly, the crankshaft 13 to the torque converter 18 via the pocket plate 60 such that torque can be transmitted therebetween. The torque-transmitting structure of the notch plate 66 is generally comprised of circumferentially spaced notches 61 (one of which is visible in FIG. 2) that are individually recessed into a transmission-side, aft-facing surface of the plate 66. This series of notches 61 is radially aligned with the pockets 63 in the pocket plate 60, each shaped and sized to receive therein a portion of a strut 74. The struts 74 engage the notch plate 66—thereby locking the pocket plate 60 and torque converter 18 to the notch plate 66 and flex plate 68 for common rotation therewith—by projecting forward (rightward in FIG. 2) into and pressing against the notches 61. Conversely, the struts 74 selectively disengage the notch plate 66—thereby unlocking the pocket plate 60 from the notch plate 66 such that the notch plate 66 freewheels on the hub 32—by receding into their respective pockets 63 out of contact with the notches 61. It will be apparent that the number, arrangement, and geometry of the engaging elements 74 and their corresponding pockets 63 can be varied from that which are shown in the drawings. The same can be said of the notches 61 in the notch plate 63. In this regard, while shown rotatably seated within the pocket plate pockets 63 and selectively operable to project into engagement with the notch plate notches 61, struts 74 may alternatively be borne by the notch plate 66 and project into engagement with the pocket plate 60.

To govern the operating status of the engine-disconnect clutch device 28 and, thus, the torque-transmitting mechanical coupling between the engine 12 and TC 18, the disconnect clutch device 28 is provided with a selector plate 62 and braking ring 64 that cooperatively control the engagement and disengagement of the struts 74 between the pocket and notch plates 60, 66. The selector plate 62 is a disk-shaped annulus neighboring the pocket plate 60 and coaxially aligned with the torque converter 18 and damper assembly 26. This selector plate 62 is mounted for rotational movement relative to the pocket plate 60 to transition back-and-forth between deactivated and activated positions. When the selector plate 62 is in its deactivated position, the engaging elements 74 of the pocket plate 60 are allowed to shift into engagement with the notches 61 of the notch plate 66, e.g., under the biasing force of the biasing members 76. On the other hand, when the selector plate 62 rotates to its activated position, the plate 62 presses or otherwise shifts the engaging elements 74 out of engagement with the notch plate 66. As illustrated selector plate 62 is machined with a series of circumferentially spaced windows 65, each of which is sized and positioned to receive therethrough a portion of a strut 74. Moving the selector plate 62 to the deactivated position aligns the windows 65 with corresponding pockets 63 such that the struts 74 seated therein project through the windows 65 and into the notches 61 of the notch plate 66. Conversely, moving the selector plate 62 to the activated position misaligns the windows 65 with the pockets 63 such that the struts 74 are pressed back into the pockets 63 via the plate 62. A selectively engageable activation device 78, which may be in the nature of a solenoid-driven brake, is activated by a vehicle controller, such as ECU 25 of FIG. 1, to govern rotational motion of the braking ring 64.

Flex plate 68 drivingly connects the damper assembly 26, disconnect device 28 and, when desired, the torque converter assembly 18 to the engine's 12 crankshaft 13—by way of engine hub 54 and bolts 56—such that rotational power is transferable back-and-forth therebetween. Projecting radially outward from an outer diameter (OD) edge of the flex plate 68 is a succession of gear teeth 73—collectively defining a "starter ring gear"—that operatively engage with gear teeth of an engine starter. Spring-mass damper systems—also referred to herein as "SDS" and identified as 72 in the drawings—are spaced circumferentially around and positioned proximate to the outer periphery of the flex plate 68. Notch plate 66 is fabricated with half-cylinder-shaped spring receptacles 75 that are equidistantly spaced along an engine-side surface thereof about the plate 66 body's circumference. Each SDS 72 is seated within a respective one of the spring receptacles 75 such that the length of each helical spring is elongated along the circumference of the plate 66. Recessed into the body of the flex plate 68 are circumferentially spaced spring pockets 77, each of which is radially aligned with a respective receptacle 75 and receives therein a respective one of the SDS helical springs. When the flex plate 68 rotates under the driving power of the engine assembly 12, spring retainers of each SDS 72 are pressed against respective circumferentially spaced walls of the spring receptacles 75 and pockets 77, thereby compressing the springs. This interaction can be used to absorb and dampen unwanted torsionals produced by the engine 12 during normal, startup, transient and shutdown operations, as some non-limiting examples.

Figure 3:
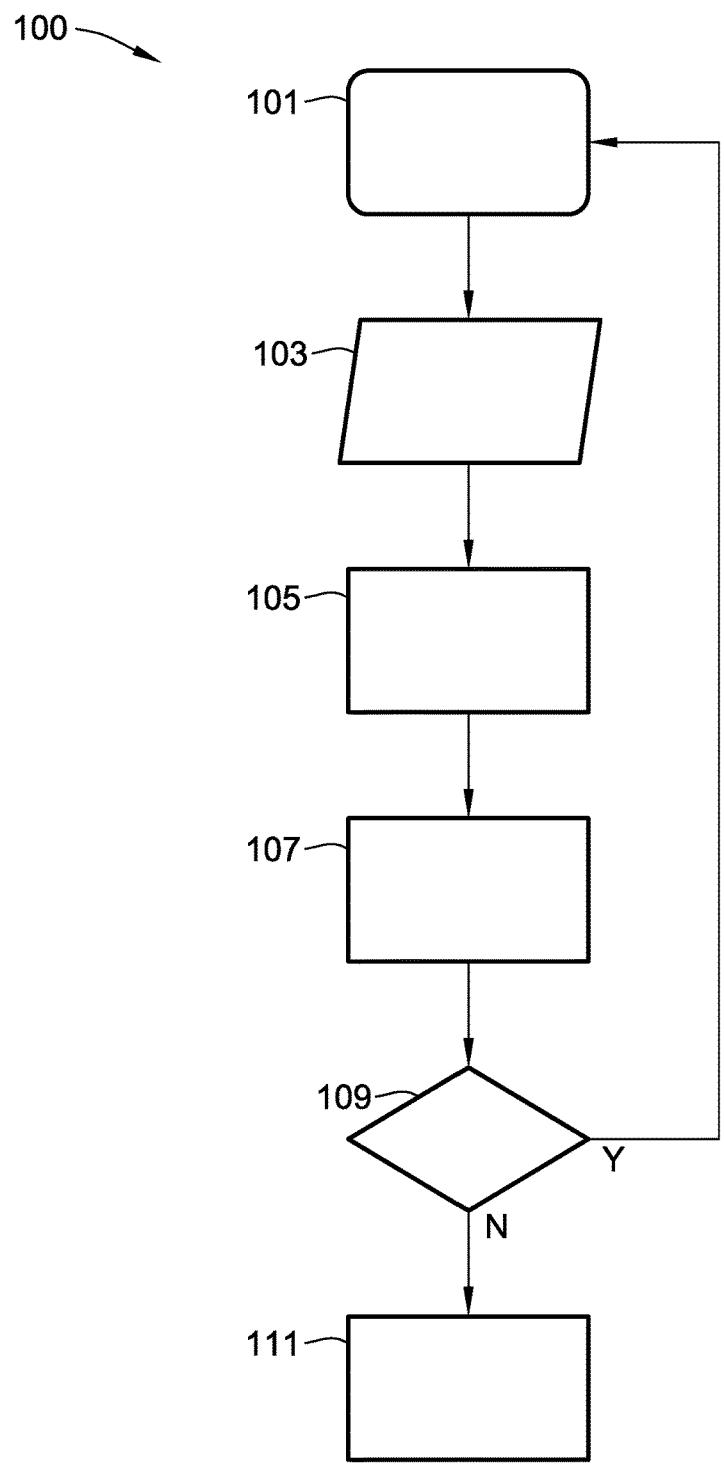
FIG. 3 is a flowchart of a representative algorithm or method for controlling operation of a hybrid electric vehicle powertrain that may correspond to instructions executed by onboard control-logic circuitry, programmable electronic control unit, or other computer-based device of a motor vehicle in accordance with aspects of the disclosed concepts.

With reference now to the flow chart of FIG. 3, an improved method or control strategy for governing operation of a hybrid electric vehicle powertrain, which may be represented in part by ICE assembly 12, MGU 14, and clutch device 28 of FIG. 1, for a motor vehicle, such as automobile 10, is generally described at 100 in accordance with aspects of the present disclosure. Some or all of the operations illustrated in FIG. 3 and described in further detail below may be representative of an algorithm that corresponds to processor-executable instructions that may be stored, for example, in main or auxiliary or remote memory, and executed, for example, by an on-board or remote ECU, central processing unit (CPU), vehicle control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 100 begins at terminal block 101 with processor-executable instructions for a programmable controller, such as ECU 25 of FIG. 1, to call up an initialization procedure for a protocol to determine, for example, a coordinated control mode response of an HEV powertrain for executing a desired vehicle operation. The control system is operable to receive, process and synthesize pertinent information and inputs, and execute control logic and algorithms to regulate various powertrain components to achieve control targets. ECU 25 may be embodied as a distributed controller architecture composed of a Transmission Control Module (TCM), an Engine Control Module (ECM), a Transmission Power Inverter Module (TPIM), and a Battery Pack Control Module (BPCM) with an integrated Hybrid Control Module (HCP) that offers hierarchical control and coordination of the aforementioned modules. In response to an operator input, as captured by any suitable user interface, the supervisory HCP and one or more of the other control modules may commence the initialization procedure to determine a required control mode response. Mode selection control of a multi-mode engine-disconnect clutch in a hybrid powertrain architecture, e.g., as described with respect to FIG. 3, may offer improved vehicle fuel economy by enabling motor-only EV driving at low speeds and low loads in a P2 mild-hybrid layout. In addition, control mode response as described herein may allow the vehicle to disconnect the engine in a more precise and systematic fashion during braking events to help increase the capture of regenerative braking ("regen") energy. In addition, faster tip-in and tip-out response is enabled through quicker engine engagement and disengagement through synchronous one-way clutch engagement and starter timing. Improved tip-in response helps to enable motor-only driving at previously unavailable vehicle speeds, and the complete engine disconnect during braking events, in a mild-hybrid architecture.

Prior to, contemporaneous with, or after executing the operation or operations associated with terminal block 101, method 100 of FIG. 3 continues to input/output block 103 to receive one or more command signals indicative of a desired HEV powertrain operation. By way of example, and not limitation, powertrain control logic processes information regarding vehicle operator intent, which may be received by any suitable interface, including input from an accelerator pedal position sensor, a brake pedal position sensor, a steering wheel angle sensor, a center stack touchscreen display, as well as information regarding current vehicle operating conditions, including vehicle speed from a road wheel sensor, engine speed from a crankshaft position sensor, transmission speed from input shaft speed (ISS) and output shaft speed (OSS) sensors, motor shaft speed, clutch state, etc. For instance, when a shift to a particular gear is manually commanded and the vehicle speed is brought within a calibrated speed range, transmission logic may responsively initiate commands to enable a corresponding powertrain operation (e.g., engine braking). A vehicle operator, in addition to providing control inputs through any of the foregoing interfaces, may also or alternatively indicate a desire to initiate a particular powertrain operation by directly commanding the vehicle to execute a specific maneuver. Implementation of a specific vehicle maneuver or powertrain operation may be initiated via a corresponding input from a vehicle driver through an electronic driver information center (DIC), which may be in the nature of a touchscreen video display panel that is positioned in a center stack of the vehicle passenger compartment or an interactive digital instrument panel (IP) and steering wheel control panel.

At process block 105, a resident or remote vehicle controller, such as ECU 25 of FIG. 1, executes a corresponding set of memory-stored instructions to determine a current clutch mode of an engine disconnect device, such as multi-mode engine-disconnect clutch device 28 of FIGS. 1 and 2. Likewise, process block 107 requires that the vehicle controller contemporaneously determine a complementary or "matching" clutch mode of the multi-mode clutch device to execute the commanded HEV powertrain operation. A selectable one-way clutch, while generally similar to a one-way clutch in terms of basic operation, is capable of producing a mechanical connection between a driving and a driven member in multiple rotational directions. Also, multi-mode SOWC designs are capable of overrunning in both clockwise and counterclockwise directions. The data tables presented below correlate different clutch activation modes (labelled "Clutch State") with specific operating modes (labelled "Powertrain Operations") and corresponding vehicle conditions (labelled "Conditions") of the HEV powertrain system of FIG. 1. Specific powertrain elements, namely the ICE assembly 12 and MGU 14, are designed to generate tractive torque in the various operating modes in response to load demands including an operator torque request. Use of the term "EV" in a table indicates electric vehicle operation—instances where tractive torque is generated solely by the MGU 14. It may be desirable, for at least some embodiments, that the ICE assembly be in an OFF state or a disconnected state during EV mode; however, such operation state is not per se required.

In accord with the present concepts, the multi-mode engine-disconnect clutch device 28 of FIGS. 1 and 2 is operable, as the name suggests, in several distinct modes: (1)

a "lock-lock" mode, in which the multi-mode clutch device 28 establishes a dual-direction mechanical connection between the engine assembly 12 and both the MGU 14 and transmission 16 such that torque may be transmitted to and from the engine 12; (2) a "free-free" mode, in which the multi-mode clutch device 28 mechanically disconnects the engine 12 from both the MGU 14 and transmission 16 and thereby prevents the transmission of torque either to or from the engine 12; (3) a "lock-free" mode, in which the multi-mode clutch device 28 establishes a unilateral "downstream flowing" mechanical connection between the engine assembly 12 and both the MGU 14 such that torque may be transmitted from the engine 12, but not to the engine 12; and (4) a "free-lock" mode, in which the multi-mode clutch device 28 establishes a unilateral "upstream flowing" mechanical connection between the engine assembly 12 and both the MGU 14 such that torque may be transmitted to, but not from the engine 12. The lock-lock mode may require the crankshaft 13 of the engine 12, the main shaft 17 of the transmission 16, and/or the motor shaft 29 of the motor 14 be constrained to rotate at the same speed. Conversely, the free-free mode may require that the speed of the crankshaft 13 differ from the speed of the main shaft 17 and the motor shaft 29. In the lock-free mode, torque may be transferred from the crankshaft 13 to the main shaft 17 and/or the motor shaft 29 while the respective speeds thereof are approximately equal; the engine-disconnect clutch device 28 over-runs when the transmission's main shaft 17 is rotating faster than the engine's crankshaft 13 as opposed to transferring torque in the opposite direction and potentially stalling the engine 12.

Once the current clutch mode of the engine disconnect device is identified (process block 105) and the matching clutch mode for executing the commanded HEV powertrain operation is identified (process block 107), the method 100 ascertains whether the current clutch mode is the same as or is complementary with the matching clutch mode at decision block 109. If the current and matching clutch modes are the same or otherwise compatible (block 109=Y) for executing the commanded HEV powertrain operation, as will be described in further detail below, there is no need to change the operating state of the multi-mode clutch device 28; as such, the method 100 may terminate and loop back to terminal block 101. However, if the current and matching clutch modes are different (block 109=N), the method 100 proceeds to process block 111 with processor-executable instructions for the vehicle controller to transmit one or more command signals to the multi-mode clutch device to switch to the matching clutch mode.

Presented below in Tables 1-4 is a catalogue of representative powertrain operations along with their "matching" clutch states, corresponding operating conditions, associated vehicle speeds, estimated subsequent actions, and exit clutch commands, if any. The enumerated operations do not constitute an exhaustive or exclusive list; as such, the powertrain operations may comprise greater, fewer, and/or alternative operations to those explicated herein. Moreover, any correlation between a particular powertrain operation and associated vehicle speed, operating condition, etc., are purely demonstrative in nature and, thus, may vary from platform to platform. Table 1 presents four distinct HEV powertrain operations: a "Key Crank" operation, an "MGU Driving" operation, an "Engine Driving" operation, and an "MGU Boosting" operation. For a Key-Crank operation, sensors may be employed in relation to an ignition column to determine whether a vehicle operator has inserted a key into the ignition switch (key-up) and turned the key (key-crank), or whether an electronic key is detected (key-sense) and a start button is pressed (key-crank). When executing a Key-Crank operation, the engine is initially OFF, and vehicle speed is at or about zero (with the transmission in neutral); the engine-disconnect clutch is shifted into either the lock-lock or the lock-free mode. Upon completion, the clutch may shift into a default mode (e.g., lock-lock); as such, the clutch need not be unloaded to exit.

TABLE 1

| POWERTRAIN OPERATION | Key Crank | MGU Driving | Engine Driving | MGU Boosting |
| --- | --- | --- | --- | --- |
| Clutch State | Lock-lock mode (lock-free optional) | Free-free mode (lock-free optional) | Lock-lock mode (lock-free optional) | Lock (but Oneway can work) |
| Conditions | Eng initially off Key to start | Eng/Trans disconnect (Eng off optional) | Eng/Trans connect Eng on | Eng/Trans connect Eng on with Motor assist |
| Veh Speeds | Zero (trans neutral) | Max EV KPH (e.g., ~< 40 KPH) | All | All |
| Action for next Step | Default mode | Require eng fire and sync | Require Clutch unload | Require Clutch unload |
| Unload clutch to Exit | N/A | N/A | Required | Required |

With continuing reference to Table 1, the MGU Driving operation is a motor-only or EV driving event which may be optimized by eliminating any potential engine-related interference. To execute the MGU Driving operation, engine output is minimized and, optionally, turned OFF, vehicle speed is at or below about 40 kilometers per hour (KPH), and the engine-disconnect clutch is shifted into either the free-free or lock-free modes such that the engine is operatively disconnected from the transmission and motor. Subsequent operations may require the engine be fired and synced with transmission speed; however, the clutch need not be unloaded to exit the current mode. In contrast to MGU Driving operations, an Engine Driving operation is an engine-only driving event, with the engine in an ON state, properly fueled, firing, and transmitting torque. To execute an Engine Driving operation, the engine is turned ON and/or synced, and the engine-disconnect clutch is shifted into either the lock-lock or the lock-free mode to operatively connect the engine to the transmission. Subsequent operations may require the engine be turned OFF or operatively disconnected from the transmission; as such, the clutch may need to be unloaded to exit the current mode. It may be desirable, for some powertrain operations, to boost the torque output of the engine; an MGU Boosting operation is a motor-boosting, engine-driving event in which the motor output helps to supplement engine output. To execute an MGU Boosting operation, both the engine and the motor are in an ON state, and the engine-disconnect clutch is shifted into either the lock-lock or the lock-free mode such that both the engine and motor are drivingly connected to the transmission. Subsequent operations may require the engine be turned OFF and operatively disconnected from the transmission; as such, the clutch may need to be unloaded to exit the MGU Boosting operation.

TABLE 2

| POWERTRAIN OPERATION | Braking (Engine Connect) | Braking (Engine Disconnect) | Power Upshift | Power Downshift |
|---|---|---|---|---|
| Clutch State | Default lock-lock (optional free-lock) | Lock-free mode (optional free-free) | Default lock-lock mode (for inertia phase) | Default lock-lock mode (optional lock-free mode) |
| Conditions | Eng braking + MGU | MGU regen regen | Eng. Driving | Eng. Driving |
| Veh. Speed | Max EV KPH/All | Max EV KPH (e.g., ~< 40 KPH) | All | All |
| Action for next Step | Require Clutch unload | Require eng fire and sync | | |
| Unload clutch to Exit | Required | N/A | | |

Table 2 presents four additional representative powertrain operations: a "Braking (Engine Connect)" operation; a "Braking (Engine Disconnect)" operation, a "Power Upshift" operation, and a "Power Downshift" operation. A Braking (Engine Connect) operation may be typified as a regenerative braking event with engine braking capabilities, typically involving vehicle speeds at or above the maximum engine-disconnect (EV) vehicle speed. To execute a Braking (Engine Connect) operation, the engine-disconnect clutch is shifted into the default lock-lock mode or, optionally, into the free-lock mode such that the engine is operatively connected to the transmission. Subsequent powertrain operations may require the clutch be unloaded to exit this Braking operation. A Braking (Engine Disconnect) operation, by comparison, may be typified as a regenerative braking event without engine braking capabilities, typically involving vehicle speeds below the maximum engine-disconnect (EV) vehicle speed. To execute a Braking (Engine Disconnect) operation, the engine-disconnect clutch is shifted into either the lock-free mode or the free-free mode such that the engine is operatively disconnected from the transmission and motor.

During vehicle operation, a multi-mode power transmission will change gears or, more colloquially, "shift" from a lower gear to a higher gear or from a higher gear to a lower gear. A transmission shift may be defined as a "power shift" when the gear change is performed while the engine is being commanded to provide a requested torque, such as when driving with an accelerator pedal at least partially depressed. Alternatively, a "power-off shift" may be typified as a gear change that is performed when the engine is not being commanded to provide a requested torque, such as when the accelerator pedal is released. If the shift is transitioning from a lower gear ratio to a higher gear ratio, then the shift may be labelled as an "upshift" operation. Analogously, a shift event from a higher gear ratio to a lower gear ratio, such as may occur when the vehicle is decelerating, may be labelled as a "downshift" operation. Power Upshift and Downshift operations may be executed when the vehicle is travelling at all available speeds. To execute a Power Upshift operation, the engine-disconnect clutch is shifted into lock-lock mode, e.g., for the inertia phase, such that the engine is drivingly connected to the transmission. If the commanded HEV powertrain operation is a Power Downshift operation, the engine-disconnect clutch is shifted into the default lock-lock mode or, optionally, into the lock-free mode.

Table 3 presents other representative HEV powertrain operations, including: a "Tip In (Engine Disconnect)" operation, a "Tip In (Engine Connect)" operation, a "Tip Out (Engine Disconnect)" operation, and a "Tip Out (Engine Connect)" operation. In a typical "tip out" maneuver, a transmission executes a shift event, e.g., transitioning from a higher gear to a lower gear, when the operator releases or 'tips out' of the accelerator pedal, leading to a closing of the throttle device. A "tip in" maneuver, on the other hand, occurs when the operator releases the brake pedal and depresses or 'tips in' on the accelerator pedal, leading to an opening of the throttle. To execute a "Tip In" operation with the engine disconnected, the engine-disconnect clutch is shifted into the lock-free mode to give the engine an opportunity to get up to speed; the powertrain is then shifted into engine-driving mode. To execute a "Tip In" operation with the engine connected, the engine-disconnect clutch is shifted into the lock-lock mode. If the commanded HEV powertrain operation is a "Tip Out" operation with the engine connected, the engine-disconnect clutch is shifted into either the lock-lock or free-lock mode. If the commanded HEV powertrain operation is a "Tip Out" operation with the engine disconnected, the engine-disconnect clutch is shifted into either the lock-free or the free-free mode.

TABLE 3

| POWERTRAIN OPERATION | Tip In (Engine Disconnect) | Tip In (Engine Connect) | Tip out (Engine Connect) | Tip Out (Sailing, Engine Disconnect) |
|---|---|---|---|---|
| Clutch State | Lock-free mode (for initialization) | Lock-lock mode | Lock-lock mode (free-lock option) | Lock-free mode (free-free optional) |
| Conditions | MGU driving | Engine Driving | MGU power does not meet power reserve | MGU power met power reserve No Engine braking |

TABLE 3-continued

| POWERTRAIN OPERATION | Tip In (Engine Disconnect) | Tip In (Engine Connect) | Tip out (Engine Connect) | Tip Out (Sailing, Engine Disconnect) |
|---|---|---|---|---|
| Veh. Speed Action for next Step | ~<Max EV Kph Require eng fire and sync | All None | Veh Speed high Lock clutch before engine torque decrease, or engine speed maintain to sync clutch, or open TCC and use motor to sync speed | Veh Speed low Require eng fire and sync |
| Unload clutch to Exit | No | No | Motor additional negative torque to unload clutch | No |

TABLE 4

| POWERTRAIN OPERATION | Tip-In-Tip-Out (Engine Disconnect) | Tip-In-Tip-Out (Engine Connect) | Tip-Out-Tip-In (Engine Connect) | Tip-Out-Tip-In (Sailing, Engine Disconnect) |
|---|---|---|---|---|
| Clutch State Conditions | Lock-free mode MGU driving | Lock-lock mode Engine Driving | Lock-lock mode MGU power does not meet coast power reserve | Lock-free mode MGU power meets coast power reserve No Engine braking |
| Veh. Speed Action for next Step | ~<Max EV KPH If Speed higher than max EV Speed (or within hysteresis band) and engine fired to sync: then move to Lock Otherwise keep Lock-Free | >Max EV KPH If Speed lower than max EV (or within hysteresis band): then Lock-Free mode before engine off Otherwise keep Lock-Lock | Veh Speed high Remain Lock-Lock | Veh Speed low If Tip in light and MGU meets power requirement, remain Lock-Free Otherwise Lock-Lock |
| Unload clutch to Exit | No | No | Motor additional negative torque to unload clutch | No |

With reference next to Table 4, there are shown four additional HEV powertrain operations, including: a "Tip-In-Tip-Out (Engine Disconnect)" operation, a "Tip-In-Tip-Out (Engine Connect)" operation, a "Tip-Out-Tip-In (Engine Disconnect)" operation, and a "Tip-Out-Tip-In (Engine Connect)" operation. To execute a Tip-In, Tip-Out operation with the engine disconnected, e.g., while the vehicle is travelling under the maximum engine-off (EV) vehicle speed (e.g., about 40 KPH), the engine-disconnect clutch is shifted into the lock-free mode to enable EV driving. In contrast, to execute a Tip-In, Tip-Out operation with the engine connected, e.g., while the vehicle is travelling at or above max EV speed, the engine-disconnect clutch is shifted into the lock-lock mode to enable engine-only driving. If the commanded HEV powertrain operation is a Tip-Out, Tip-In operation with the engine connected, e.g., while the vehicle is traveling at high vehicle speeds, the engine-disconnect clutch is shifted into either the lock-lock or the free-lock mode. If, however, the commanded HEV powertrain operation is a Tip-Out, Tip-In (or "sailing") operation with the engine disconnected, e.g., while the vehicle is traveling at low vehicle speeds, the engine-disconnect clutch is shifted into either the lock-free or the free-free mode.

FIG. 4 illustrates a representative method 200 for controlling operation of a hybrid electric vehicle to help facilitate seamless unloading of an engine-disconnect SOWC during a coasting event. The illustrated flow chart may be applied for all torque converter clutch (TCC) operating states (e.g., open, lock, electronically controlled capacity clutch (ECCC) modes, etc.), with the associated motor torque and brake torque commands being calibrated with each TCC state. In a similar regard, FIG. 5 illustrates a representative method 300 for controlling operation of an HEV to help effectuate seamless unloading of an engine-disconnect SOWC during a regenerative braking event. By emulating engine drag through the motor after engine disconnect, the system helps to ensure a quick transition from a transmission neutral state (during engine disconnect) to a gear state through active turbine speed matching. Mechanical brake 'fill in' during transmission neutral state may be employed to emulate engine drag. As a non-limiting example, during a clutch disconnect maneuver, e.g., when the transmission is in neutral, the vehicle's electronic brake control module (EBCM) may emit a command signal to one or more brake system components (e.g., the brake fluid pumps that fill the calipers for slowing the road wheel) to generate a braking torque that will emulate engine drag torque. This braking torque will be "blended" in as the engine is disconnected to enable a smooth transition and ensure that this part of the maneuver is not perceived as a disturbance by the vehicle occupant or occupants.

At process blocks 201 and 301 of FIGS. 4 and 5, the hybrid powertrain operating system (HOS) initializes a protocol to unload and disconnect a SOWC in a HEV powertrain, e.g., in response to one or more driver inputs. For method 200, process block 201 may be responsive to a determination that a vehicle coasting event has been initiated, e.g., via sensor signals indicating both the accelerator and brake pedals have been released while the vehicle is traveling at or above a minimum calibrated vehicle speed (e.g., 20 KPH). Contrastingly, process block 301 may be executed in response to a determination that a vehicle regenerative braking event has been initiated, e.g., via sensors signals indicating the accelerator has been released and the brake pedal is depressed for at least a minimum calibrated brake time (e.g., approximately 5 seconds). Methods 200, 300 then continue to process blocks 203 and 303, respectively, with executable instructions, e.g., for the vehicle PCM, to issue command signals for the transmission to shift into a neutral state, and executable instructions, e.g., for the EBCM, to issue command signals to adjust wheel braking torque to maintain vehicle deceleration. As each method 200, 300 executes these respective steps, the transmission is shifted into neutral, engine fuel is reduced or cut, and transmission speed is slowed. By shifting the transmission into neutral, the turbine speed of the torque converter may begin to decrease at an accelerated rate relative to the axle speed of the vehicle, which is downstream of the transmission. Process blocks 205 and 305 of FIGS. 4 and 5 similarly include instructions, e.g., for the PCM, to issue command signals to the motor to generate sufficient motor torque to unload the SOWC. Motor operation is governed to provide a torque pulse such that the driveline side of the SOWC experiences a larger negative torque than the engine side of the SOWC, which experiences negative torque from engine compression and friction. In so doing, the engine side of the SOWC has the appearance or feel of being unloaded such that the actuator can open the SOWC.

At decision blocks 207 and 307, the PCM or other vehicle controller or control module determines whether or not the SOWC has been successfully opened. If not (block 207=N; block 307=N), each method 200, 300 may loop back and repeat process block 205, 305 until the clutch is operatively opened. Once the system confirms that the SOWC has indeed opened (block 207=Y; block 307=Y) such that the clutch has dropped the engine, e.g., by comparing engine speed to the motor speed and/or trans pump speed, the methods 200, 300 proceed to process blocks 209 and 309, respectively, with instructions to output corresponding command signals for the MGU to generate sufficient motor torque to match TC turbine speed to transmission-output driveline speed. In effect, the MGU may be employed as an actuator to drive the TC pump to a higher speed until the turbine speed matches the axle speed with the gear multiplication.

Upon completion of the operation or operations associated with process blocks 209, 309 of FIGS. 4 and 5, the methods 200, 300 ascertain whether or not the turbine speed sufficiently corresponds to the transmission output speed at decision blocks 211 and 311, respectively. If the driveline and torque converter speeds are not within a calibrated minimum speed differential (block 211=N; block 311=N), each method 200, 300 may loop back and repeat operation block 209, 309 until the speeds sufficiently match. Once the powertrain control system confirms that the torque converter and power transmission output speeds match (block 211=Y; block 311=Y), the transmission is put back into gear, and the output motor torque of the MGU and mechanical braking torque generated by the vehicle brake system are adjusted to emulate engine drag at process blocks 213 and 313, respectively. By way of example, and not limitation, after the transmission is shifted back into gear, brake torque will be blended out and the motor's negative (braking) torque will be blended in to help emulate engine drag. For method 200, this enables the TPIM and BPCM to capture regen energy for charging the traction battery pack while the vehicle is coasting. For method 300, the vehicle is executing a mechanical braking event, e.g., the driver is depressing the brake pedal, both motor and mechanical braking torque may be adjusted to maximize the regen energy captured for the battery pack such that total torque meets the driver brake pedal request.

It may be desirable, for at least some applications, to govern motor torque to achieve a net zero torque at the engine-side of the SOWC with an open TCC. The following equation may be used to calculate motor torque command to emulate engine drag (e.g., for process block 213):

$$T_{motor} = \left(T_{eng,friction}\left(\frac{w_{mot}}{gear_{(pump,mot)}}\right) + J_{pump} \cdot w_{mot}\right)\frac{1}{gear_{(pump,mot)}} +$$
$$J_{mot} \cdot w_{mot} + \ldots + PI(V_{veh-desired}, V_{veh})$$

where $T_{motor}$ is an emulation motor torque; $w_{mot}$ is a motor speed; and $J_{mot}$ is a motor inertia; $J_{pump}$ is a torque converter pump inertia. In addition, $T_{eng,friction}$ is an estimated engine friction torque based on a look-up table as a function of motor speed and gear ratio, and $V_{veh-desired}$ is a vehicle speed before the transmission is shifted into neutral, e.g., at block 203. $PI(V_{veh-desired}, V_{veh})$ is a PI controller based on latched vehicle acceleration before a maneuver starts and current vehicle acceleration, functioning as a feedback term to calculate motor torque command.

The above-mentioned maneuver to unload the Selectable OWC as illustrated in FIGS. 4 and 5 may also be accomplished by firing the engine, instead of using the electrical machine. In this method, for example, the engine (which is in a DFCO state) may be fired to overcome its own drag torque on the engine side of the SOWC. As the engine is used to overcome its drag torque, the SOWC may be unloaded on the engine side, and then can be opened by the actuator. The motor and the mechanical brakes may be used to maintain the perception of engine drag (–ve acceleration) as the engine is disconnected from the drive train.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for controlling operation of a hybrid electric vehicle (HEV) powertrain, the HEV powertrain including an engine with an engine output member, a transmission with a transmission input member, an electric motor with a motor output member selectively connectable to the transmission input member, and a multi-mode clutch device selectively disconnecting the engine output member from the transmission input member, the method comprising:

receiving a command signal indicative of an HEV powertrain operation, the HEV powertrain operation being dependent upon a driver input and a current vehicle operating condition;

determining a current clutch mode of the multi-mode clutch device, the current clutch mode being dependent upon the current vehicle operating condition;

determining a matching clutch mode of the multi-mode clutch device to execute the HEV powertrain operation, the multi-mode clutch device being operable in the following modes:
- a lock-lock mode in which the multi-mode clutch device transmits torque to and from the engine,
- a free-free mode in which the multi-mode clutch device disconnects the engine output member from the transmission input member and thereby prevents torque transmission to and from the engine,
- a lock-free mode in which the multi-mode clutch device transmits torque from and not to the engine, and
- a free-lock mode in which the multi-mode clutch device transmits torque to and not from the engine; and responsive to the current and matching clutch modes being different, transmitting a command signal to the multi-mode clutch device to switch from the current clutch mode to the determined matching clutch mode.

2. The method of claim 1, wherein the HEV powertrain operation is an engine-only driving operation, and the matching clutch mode is either one of the lock-lock mode and the lock-free mode.

3. The method of claim 1, wherein the HEV powertrain operation is a motor-only driving operation, and the matching clutch mode is either one of the free-free mode and the lock-free mode.

4. The method of claim 1, wherein the HEV powertrain operation is a motor-boosting engine-driving operation, and the matching clutch mode is either one of the lock-lock mode and the lock-free mode.

5. The method of claim 1, wherein the HEV powertrain operation is a key-crank operation, and the matching clutch mode is either one of the lock-lock mode and the lock-free mode.

6. The method of claim 1, wherein the HEV powertrain operation is a regenerative-braking engine-connected operation, and the matching clutch mode is either one of the lock-lock mode and the free-lock mode.

7. The method of claim 1, wherein the HEV powertrain operation is a regenerative-braking engine-disconnected operation, and the matching clutch mode is either one of the lock-free mode and the free-free mode.

8. The method of claim 1, wherein the HEV powertrain operation is a power upshift operation, and the matching clutch mode is the lock-lock mode.

9. The method of claim 1, wherein the HEV powertrain operation is a power downshift operation, and the matching clutch mode is either one of the lock-lock mode and the lock-free mode.

10. The method of claim 1, wherein the HEV powertrain operation is a tip-in engine-disconnect operation, and the matching clutch mode is the lock-free mode.

11. The method of claim 1, wherein the HEV powertrain operation is a tip-in engine-connect operation, and the matching clutch mode is the lock-lock mode.

12. The method of claim 1, wherein the HEV powertrain operation is a tip-out engine-connect operation, and the matching clutch mode is either one of the lock-lock mode and the free-lock mode.

13. The method of claim 1, wherein the HEV powertrain operation is a tip-out engine-disconnect operation, and the matching clutch mode is either one of the lock-free mode and the free-free mode.

14. A hybrid electric vehicle (HEV) comprising:
a vehicle body with a plurality of road wheels;
an internal combustion engine (ICE) assembly attached to the vehicle body, the ICE assembly including a crankshaft configured to output torque generated by the ICE assembly;
a motor/generator unit (MGU) attached to the vehicle body and connected in parallel power-flow communication with the ICE assembly, the MGU including a motor output shaft configured to output torque generated by the MGU;
a multi-speed transmission operable to receive, selectively modify, and transmit torque output by the MGU and ICE assembly to one or more of the road wheels;
a multi-mode selectable one-way clutch (SOWC) interposed between the ICE assembly and both the MGU and multi-speed transmission, the multi-mode SOWC being operable in: a lock-lock mode in which the multi-mode SOWC transmits torque to and from the engine; a free-free mode in which the multi-mode SOWC disconnects the engine from the transmission and the MGU to thereby prevent torque transmission to and from the engine; a lock-free mode in which the multi-mode SOWC transmits torque from and not to the engine; and a free-lock mode in which the multi-mode SOWC transmits torque to and not from the engine; and
a vehicle controller communicatively connected to the multi-mode SOWC and programmed to execute memory stored instructions to:
receive a command signal indicative of an HEV powertrain operation;
determine a current clutch mode of the multi-mode SOWC;
determine a matching clutch mode of the multi-mode SOWC to execute the HEV powertrain operation; and
responsive to the current and matching clutch modes being different, transmit a command signal to the multi-mode SOWC to switch from the current clutch mode to the determined matching clutch mode.

15. The hybrid electric vehicle of claim 14, wherein the HEV powertrain operation is either one of:
an engine-only driving operation with the matching clutch mode being either one of the lock-lock mode and the lock-free mode; and
a motor-only driving operation with the matching clutch mode being either one of the free-free mode and the lock-free mode.

16. The hybrid electric vehicle of claim 14, wherein the HEV powertrain operation is either one of:
a regenerative-braking engine-connected operation with the matching clutch mode being either one of the lock-lock mode and the free-lock mode; and
a regenerative-braking engine-disconnected operation with the matching clutch mode being either one of the lock-free mode and the free-free mode.

17. The hybrid electric vehicle of claim 14, wherein the HEV powertrain operation is either one of:
a power upshift operation with the matching clutch mode being the lock-lock mode; and a power downshift operation with the matching clutch mode being either one of the lock-lock mode and the lock-free mode.

18. The hybrid electric vehicle of claim 14, wherein the HEV powertrain operation is either one of:
 a tip-in engine-disconnect operation with the matching clutch mode being the lock-free mode; and
 a tip-in engine-connect operation with the matching clutch mode being the lock-lock mode.

19. The hybrid electric vehicle of claim 14, wherein the HEV powertrain operation is either one of:
 a tip-out engine-connect operation with the matching clutch mode being either one of the lock-lock mode and the free-lock mode; and
 a tip-out engine-disconnect operation with the matching clutch mode being either one of the lock-free mode and the free-free mode.

20. The hybrid electric vehicle of claim 14, wherein the HEV powertrain operation is either one of:
 a motor-boosting engine-driving operation with the matching clutch mode being either one of the lock-lock mode and the lock-free mode; and
 a key-crank operation with the matching clutch mode being either one of the lock-lock mode and the lock-free mode.

* * * * *